United States Patent
Acker et al.

[11] Patent Number: 5,803,485
[45] Date of Patent: Sep. 8, 1998

[54] GAS BAG LATERAL IMPACT PROTECTIVE DEVICE

[75] Inventors: Dominique Acker, Alfdorf; Thomas Richter, Schwäbisch Gmünd, both of Germany

[73] Assignee: TRW Occupant Restraint Systems GmbH, Alfdorf, Germany

[21] Appl. No.: 727,192

[22] Filed: Oct. 8, 1996

[30] Foreign Application Priority Data

Oct. 17, 1995 [DE] Germany ................. 195 38 657.4

[51] Int. Cl.⁶ .................................................. B60R 21/22
[52] U.S. Cl. ................ 280/728.2; 280/729; 280/730.2
[58] Field of Search .................. 280/730.2, 730.1, 280/729, 728.2, 728.1; 297/216.13

[56] References Cited

U.S. PATENT DOCUMENTS

| | | | |
|---|---|---|---|
| 5,251,931 | 10/1993 | Semchena et al. | 280/730.1 |
| 5,556,128 | 9/1996 | Sinnhuber et al. | 280/730.2 |
| 5,647,609 | 7/1997 | Spencer et al. | 280/730.2 |

FOREIGN PATENT DOCUMENTS

| | | |
|---|---|---|
| 0565501 | 10/1993 | European Pat. Off. . |
| 0611684 | 8/1994 | European Pat. Off. . |
| 0653335 | 5/1995 | European Pat. Off. . |
| 4430412 | 10/1995 | Germany . |
| 5-4553 | 1/1993 | Japan . |
| 5-105024 | 4/1993 | Japan . |
| 5-139232 | 6/1993 | Japan ........................ 280/730.2 |
| 6-227348 | 8/1994 | Japan ........................ 280/730.2 |
| 3014439 | 5/1995 | Japan . |
| 09039710 | 2/1997 | Japan . |
| 97/06987 | 2/1997 | WIPO . |

*Primary Examiner*—Peter C. English
*Attorney, Agent, or Firm*—Tarolli, Sundheim, Covell, Tummino & Szabo

[57] ABSTRACT

A gas bag lateral impact protective device for vehicle occupants is integrated in the back of a vehicle seat and comprises a compressed gas source, a thorax protecting gas bag and a head protecting gas bag. Both gas bags are to be inflated by the compressed gas source and are adapted to deploy on inflation in a space to the side of the seat back, the head protecting gas bag, upon inflation, deploying above the thorax protecting gas bag.

9 Claims, 16 Drawing Sheets

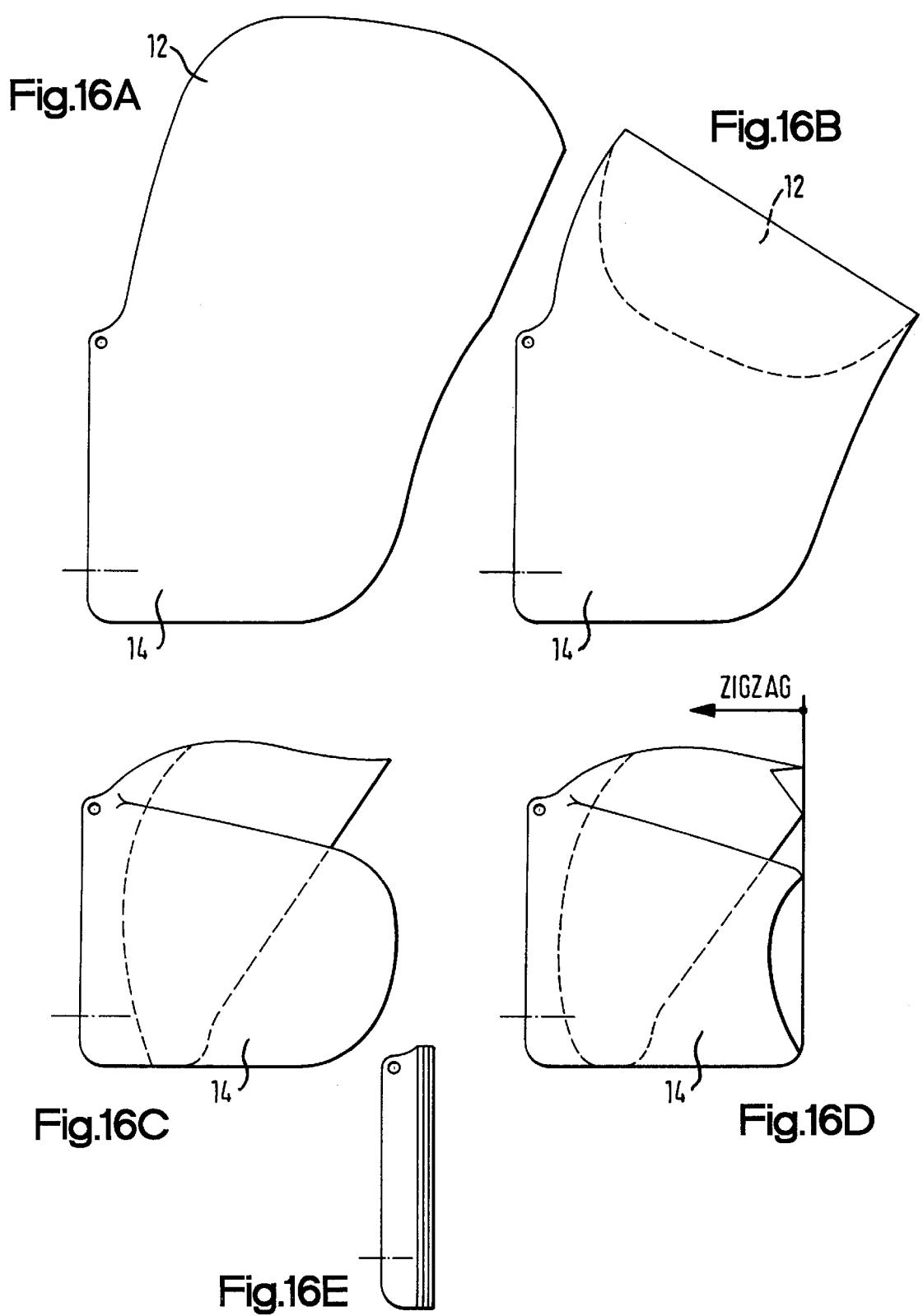

GAS BAG LATERAL IMPACT PROTECTIVE DEVICE

BACKGROUND OF THE INVENTION

The invention relates to a gas bag lateral impact protective device for vehicle occupants.

A gas bag lateral impact protective device is disclosed in the U.S. Pat. No. 5,112,079. It serves to prevent contact between the vehicle occupant with parts of the vehicle such as the B column or the inner side of the door following lateral impact. The installation of the protective device in the back of a vehicle seat is advantageous in the sense that the position of the deployed gas bag in relation to the vehicle occupant is independent of the position of the seat in the longitudinal direction of the vehicle. However, the head region is not sufficiently protected by such a gas bag, because the deployment of the gas bag is impeded by the safety belt.

SUMMARY OF THE INVENTION

The gas bag lateral impact protective device according to the present invention provides superior protection not only for the thorax of a vehicle occupant, but also for his head. According to the invention, this protective device is integrated in the back of a vehicle seat and comprises a compressed gas source, a thorax protecting gas bag and a head protecting gas bag. Both gas bags are to be inflated by the compressed gas source and are adapted to deploy on inflation in a space to the side of the seat back, the head protecting gas bag, upon inflation, deploying above the thorax protecting gas bag. Since the head protecting gas bag accordingly deploys substantially independently from the thorax protecting gas bag, the direction in which it expands during deployment may be so predetermined by suitable measures that obstruction by the safety belt is avoided. Suitable measures more particularly include the alignment of the connection opening of the gas bag, the fold pattern and furthermore the configuration of the gas bag itself.

The invention is based on the recognition that two different modes of deployment of a head protecting gas bag are particulary suitable for preventing impedment of completely unfolding the head protecting gas bag. One mode of inflation consists of deploying the head protecting gas bag during inflation initially predominantly obliquely upward and forward and then predominantly obliquely upward and rearward so that it finally assumes a position to the side of the head of the vehicle occupant. Owing to this special direction of deployment of the head protecting gas bag the latter deploys along a generally arcuate path around the safety belt so that the latter does not obstruct the deployment of the head protecting gas bag. For achieving this particular direction of deployment of the head protecting gas bag, it is particularly advantageous to provide the head protecting gas bag and the thorax protecting gas bag independent from each other, as is provided according to a preferred embodiment of the invention.

According to another preferred embodiment of the invention, it is provided that the thorax protecting gas bag and the head protecting gas bag adjoin each other. With this configuration, the thorax protecting gas bag serves as a support for the head protecting gas bag.

It is further possible that the head protecting gas bag and the thorax protecting gas bag are connected with each other by an equalization duct. This configuration makes use of the time difference between impact of the thorax of a vehicle occupant at the corresponding gas bag and impact of the head at the corresponding gas bag during a side impact, this delay being the result of the fact that the thorax of a vehicle occupant is located closer to the corresponding gas bag than the head of the occupant. Due to the equalization duct, a certain volume of gas displaced upon impact of the thorax at the thorax protecting gas bag can be used for completely inflating the head protecting gas bag.

A different way of unfolding the head protecting gas bag consists in deploying this gas bag namely upwardly. Should the safety belt extend in the region of deployment of the head protecting gas bag, the safety belt will be lifted upwardly by the head protecting gas bag. In the prior art, this collision between the head protecting gas bag and the safety belt has been considered as a problem. However, the applicant has discovered that this collision has no undesirable effect on the head protecting gas bag since a certain belt slack occurs during a side impact due to a displacement of the vehicle occupant relatively to the vehicle, this belt slack allowing unimpeded deployment of the head protecting gas bag. A deployment of the head protecting gas bag can be achieved in a particular advantageous manner if the head protecting gas bag and the thorax protecting gas bag are formed integral with each other, as is provided according to another preferred embodiment.

It is preferably provided that the head protecting gas bag is connected to the compressed gas source via the thorax protecting gas bag. This configuration leads to a particularly simple and compact restraining module and at the same time allows using the impact of the vehicle occupant thorax at the thorax protecting gas bag for completely inflating the head protecting gas bag.

Further advantageous developments of the invention are defined in the dependent claims.

The invention will now be described with reference to the accompanying drawings.

BRIEF DESCRIPTION OF THE DRAWING

FIG. 16 diagrammatically shows a mode of folding the head protecting gas bag and the thorax protecting gas bag of FIG. 12.

DETAILED DESCRIPTION OF THE INVENTION

Figure 1:
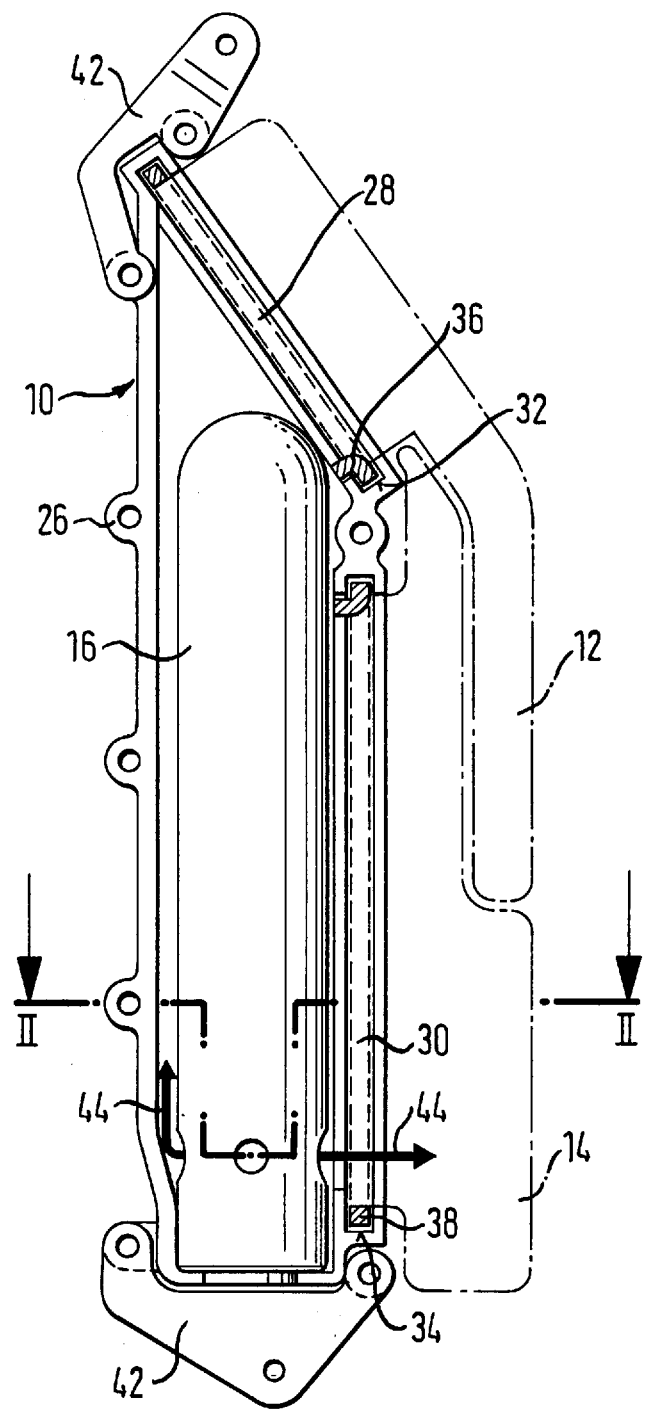
FIG. 1 is a diagrammatic longitudinal section taken through a side impact gas bag protective device in accordance with a first embodiment of the invention.
Figure 2:
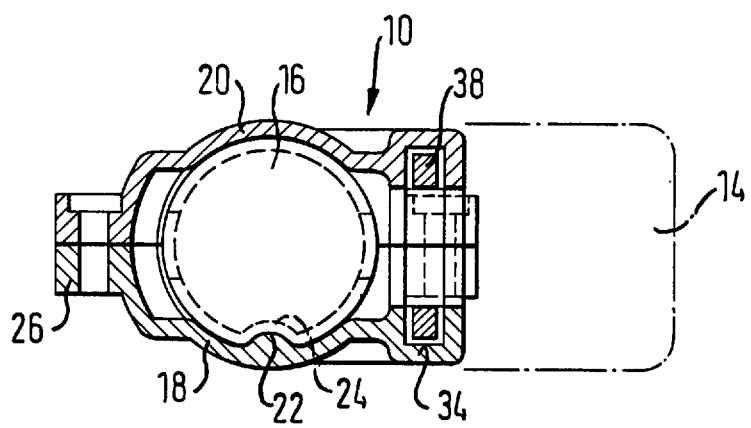
FIG. 2 is a diagrammatic cross section taken through the protective device of FIG. 1 along the line II—II.
Figure 3:
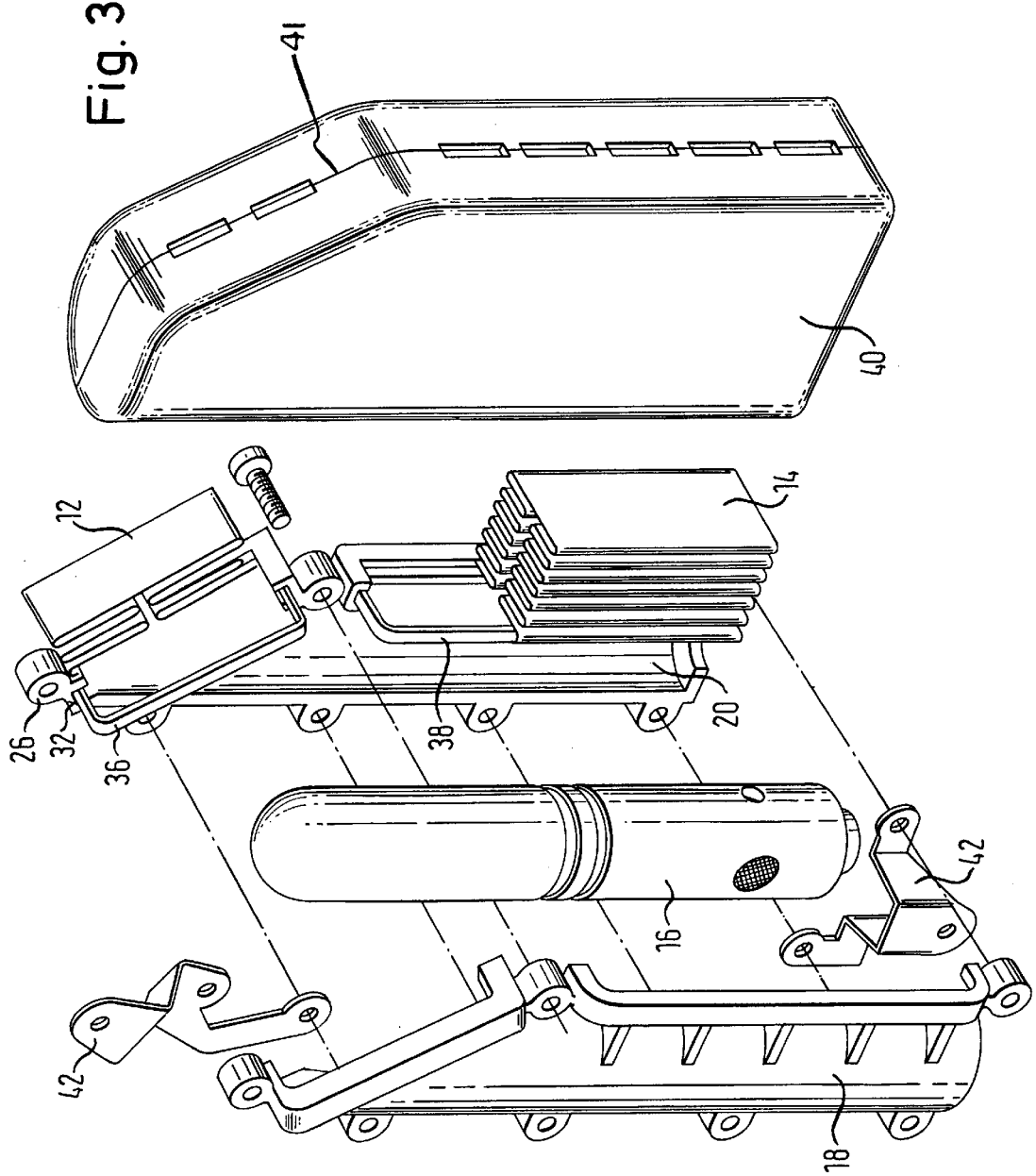
FIG. 3 is a diagrammatic and partly sectioned exploded view of the protective device of FIG. 1.

In FIGS. 1 through 3 the gas bag lateral impact device in accordance with a first embodiment of the invention is depicted. The system has as its main parts a housing 10, a head protecting gas bag 12, a thorax protecting gas bag 14 and a source 16 of gas under pressure.

In the illustrated embodiment the housing 10 is made up of two housing shells 18 and 20 between which the compressed gas source 16 is mounted and held. This is preferably achieved by having such dimensions of the housing in relation to the compressed gas source that when screwing the two housing halves 18 and 20 together there is a suitable clamping action on the compressed gas source so that the same is securely located in the housing 10. Additionally it is possible to utilize mutually complementary interlocking elements on the housing and the source of compressed gas in order to improve attachment. Such interlocking elements are indicated in FIG. 2 by reference numeral 22 (denoting a bead extending in the longitudinal direction of the housing on the inner side thereof) and by reference numeral 24 (denoting a groove extending in the longitudinal direction of the source 16 of compressed gas). The two housing shells 18 and 20 are connected together by screws, which are screwed into fastening eyes 26.

The two housing shells 18 and 20 are so configured that in the assembled state they define two connection openings for the gas bags of the protective device, i. e. a connection opening 28 for the head protecting gas bag 12 and a connection opening 30 for the thorax protecting gas bag 14. Along the inner edge of each connection opening a groove 32 and, respectively, 34 is formed. In the screwed together state of the housing shells 18 and 20 a fastening ring 36 and, respectively, 38 with which the inlet opening of each gas bag 12 and, respectively, 14 is provided, is received in this groove. It is in this manner that the head protecting gas bag 12 and the thorax protecting gas bag 14 are securely connected with the housing 10. The two gas bags are folded up in a suitable fashion outside the housing, the folded up head protecting gas bag 12 partially assuming a position on the folded up thorax protecting gas bag 14 on the side facing away from the compressed gas source. This is more especially to be seen in FIG. 1. The folded gas bags are finally fixed in place by a guard cover 40 indicated diagrammatically in FIG. 3. The guard cover has a rip open seam 41 along which the guard cover breaks upon inflation of the gas bags 12 and 14.

It will be seen from FIGS. 1 and 3 that at the two axial ends of the housing there is the provision of an attachment lug 42 manufactured separately from the housing and serving to join the gas bag lateral impact protective device with the back of a vehicle seat, in which it is to be mounted.

Figure 4:
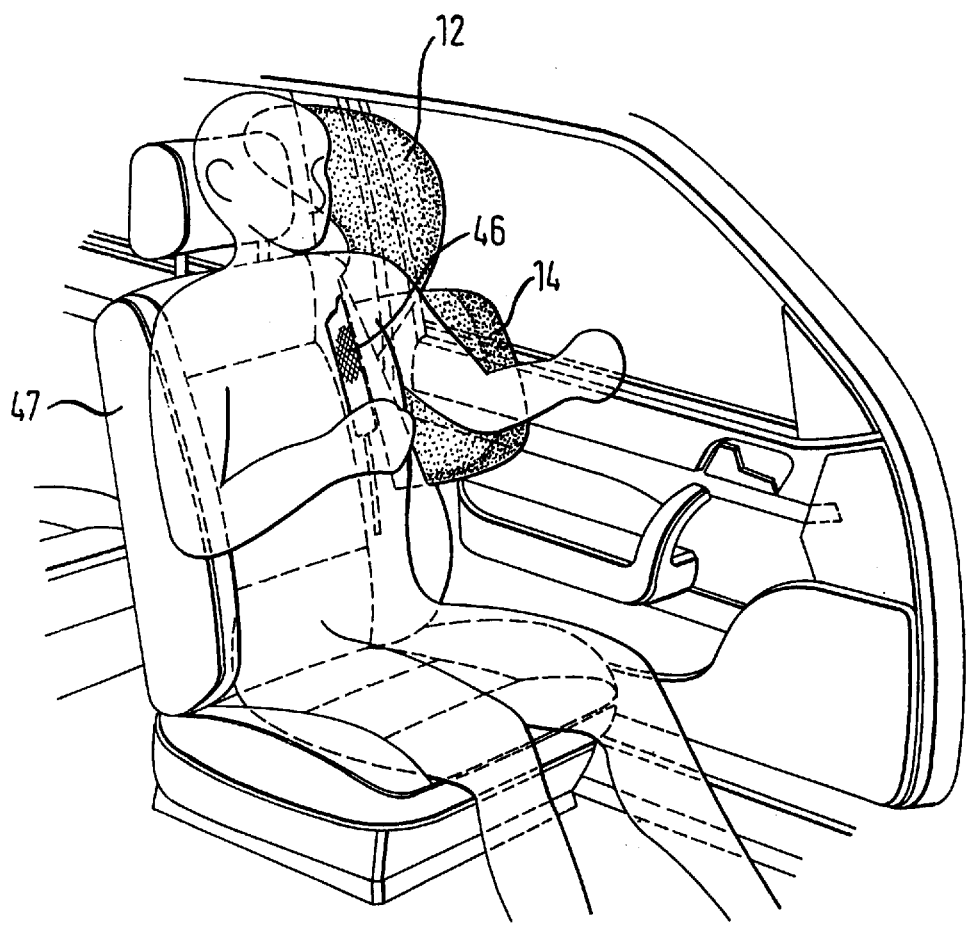
FIG. 4 is a diagrammatic view of the arrangement of the thorax protecting gas bag and of the head protecting gas bag, each in the deployed state.

FIG. 4 indicates the general configuration of the two gas bags 12 and 14 in the inflated condition thereof so that an optimum protecting action is made available for a vehicle occupant in the case of a lateral impact. In this figure a vehicle occupant is shown using the driver's seat of a vehicle with the diagrammatically indicated safety belt 46 properly fastened. Between the upper body of the vehicle occupant and the door a deployed thorax protecting gas bag 14 extends from the seat back 47. For protection of the vehicle occupant's head as well the head protecting gas bag 12 extends from the seat back 47 above the thorax protecting gas bag. To ensure that the safety belt 46 does not impede deployment of the head protecting gas bag 12, same extends from the seat back 47 firstly obliquely upward and forward and then after this obliquely upward and backward so that the head protecting gas bag 12 fits generally arcuately around the safety belt and assumes a position partially in front of and partially to the side of the vehicle occupant's head.

Figure 5:
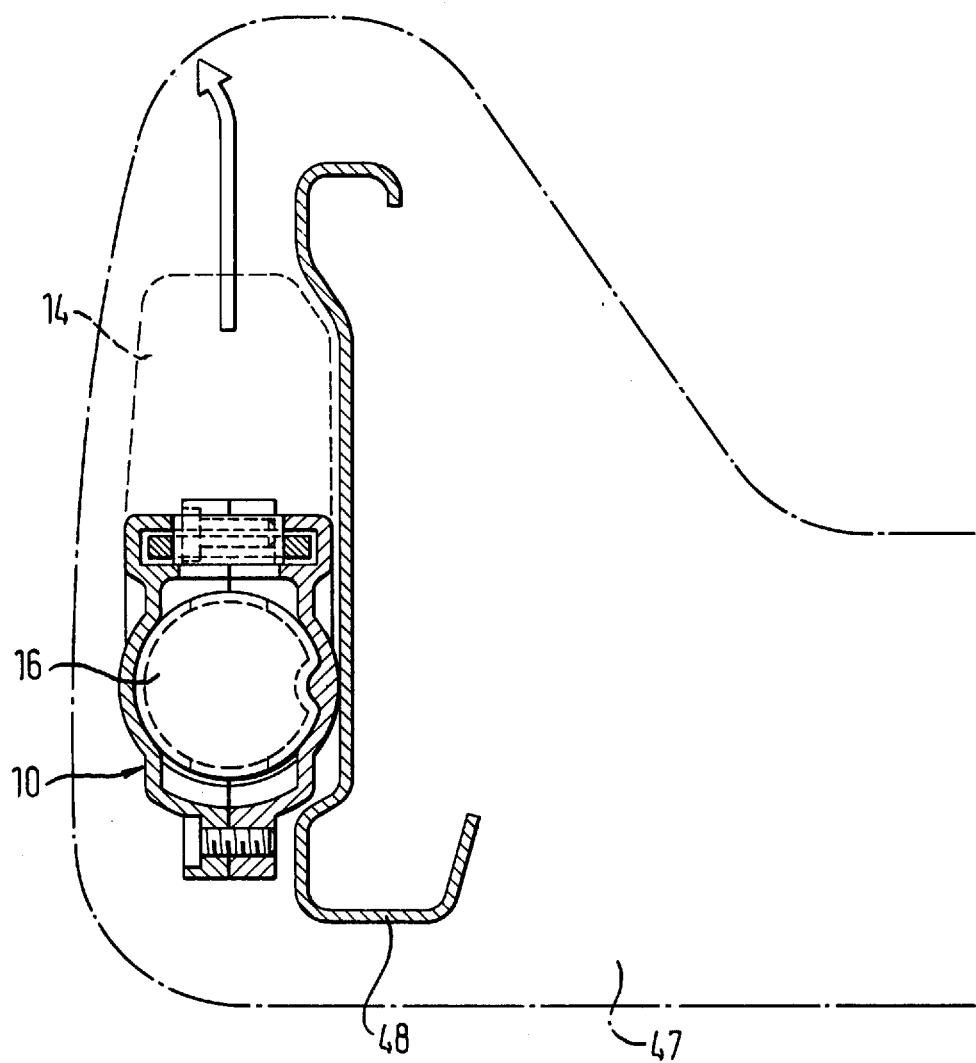
FIG. 5 is a cross section similar to FIG. 2 taken through the protective device arranged in a seat back.
Figure 6:
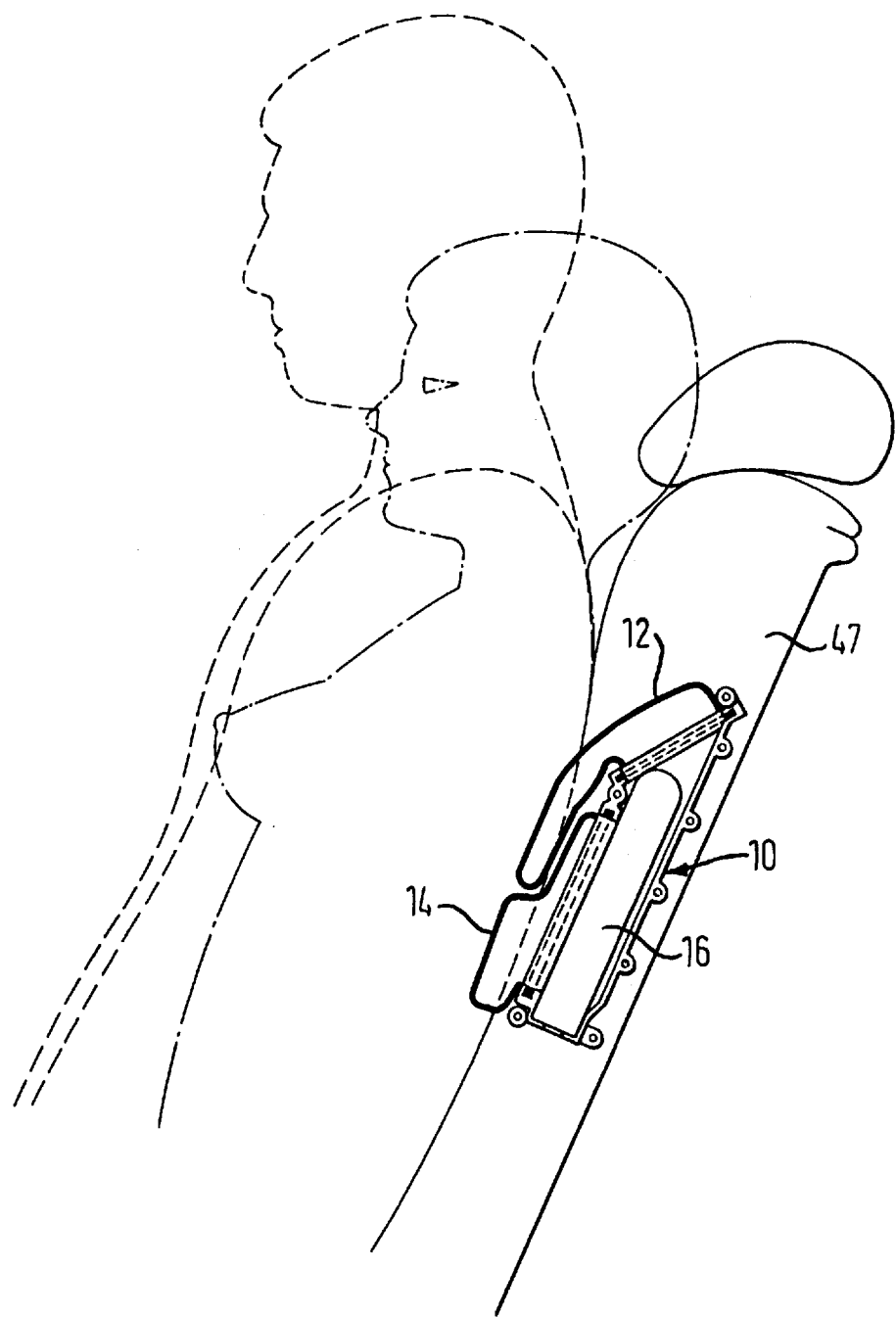
FIG. 6 shows a longitudinal section similar to that of FIG. 1 taken through the protective device installed in a seat back.
Figure 7:
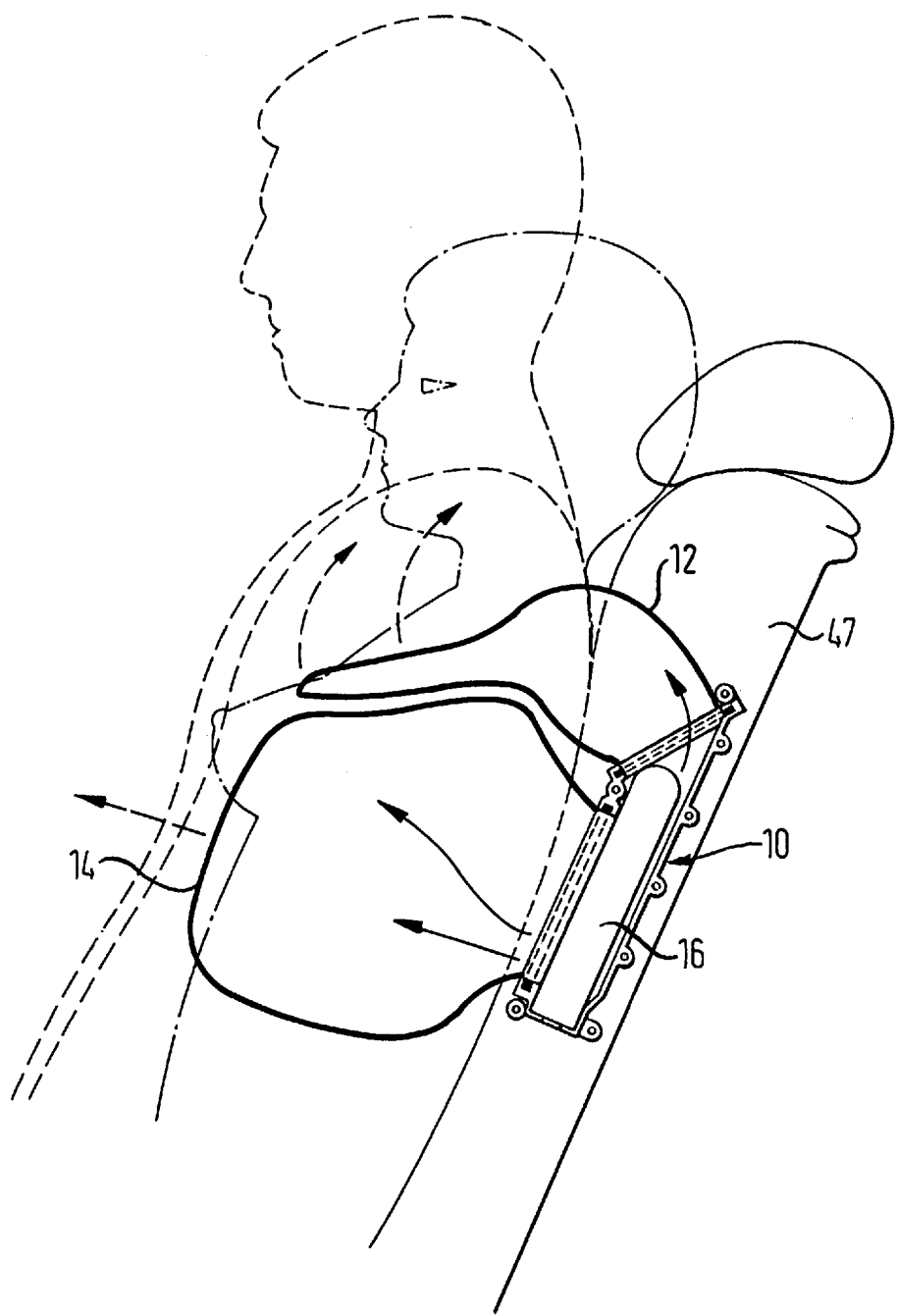
FIG. 7 shows the protective device of FIG. 6 in a first intermediate stage of deployment of the two gas bags.
Figure 8:
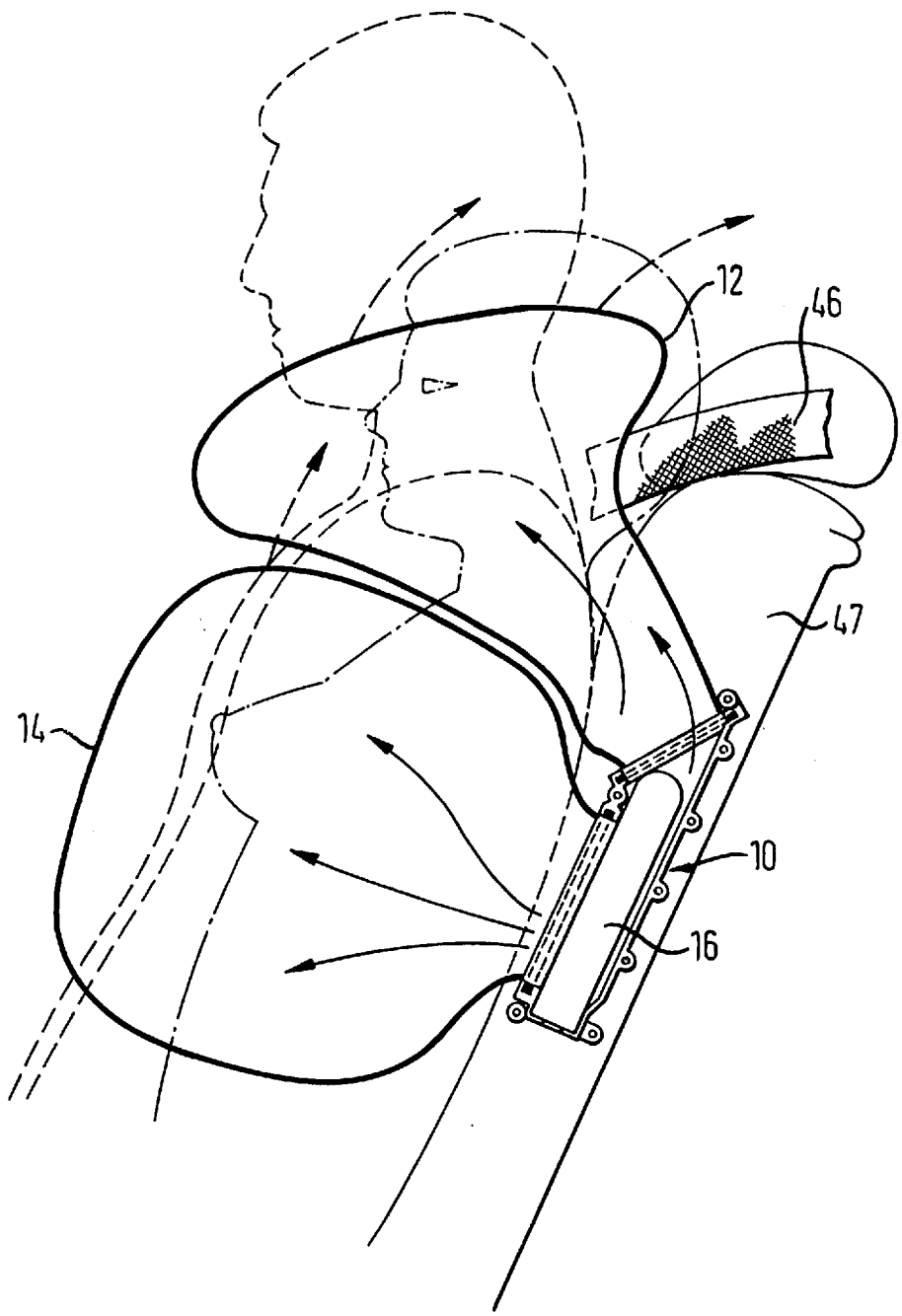
FIG. 8 shows the protective device of FIG. 6 in a second intermediate stage of deployment of the two gas bags.

On the basis of FIGS. 5 through 9 an account will now be given of the deployment of the two gas bags. In this respect no detailed description will be provided of the triggering sensor system, it being assumed that a specialist in vehicle occupant safety technology will be familiar with same. In FIG. 5 a cross section is represented through the seat back 47 as in FIG. 4. On the left hand side of the seat back 47 the housing 10 is so secured to the frame 48 of the seat back that the longitudinal axis of the housing 10 extends generally in parallelism to the longitudinal axis of the seat back 47. Accordingly the connection opening 30 for the thorax protecting gas bag is generally directed forward and the connection opening 28 for the head protecting gas bag is in a plane extending obliquely in relation to the longitudinal axis of the seat back 47. If starting from this state the gas bag lateral impact protective device is triggered by means of the triggering sensor system, gas under pressure will flow from the compressed gas source 16 into the interior of the housing (arrows 44 in FIG. 1). This gas under pressure will flow out of the interior of the housing 10 through the connection openings 28 and 30 into the two gas bags 12 and 14, which at the start of their deployment firstly break open the guard cover 40 along the rip open seam 41 which is aligned to extend along the longitudinal axis of the seat back 47. Following this the two gas bags 12 and 14 will commence inflation. A first intermediate stage of such deployment is diagrammatically indicated in FIG. 7. It will be seen here that the thorax protecting gas bag 14 generally deploys forward, whereas the head protecting gas bag 12 firstly deploys forward and obliquely upward. In FIG. 8 it will be seen that in an advanced stage of deployment of the two gas bags the thorax protecting gas bag 14 will be generally further deployed forward, whereas from a certain stage of deployment of the head protecting gas bag 12 same will deploy further upward but then also obliquely in the rearward direction. This change in the deployment direction occurs only when the head protecting gas bag 12 has deployed to a sufficient extent upward so that deployment to the rear will not lead to an undesired interaction with the safety belt 46 and it is aided by contact between the thorax protecting gas bag 14 and the head protecting one 12.

Figure 9:
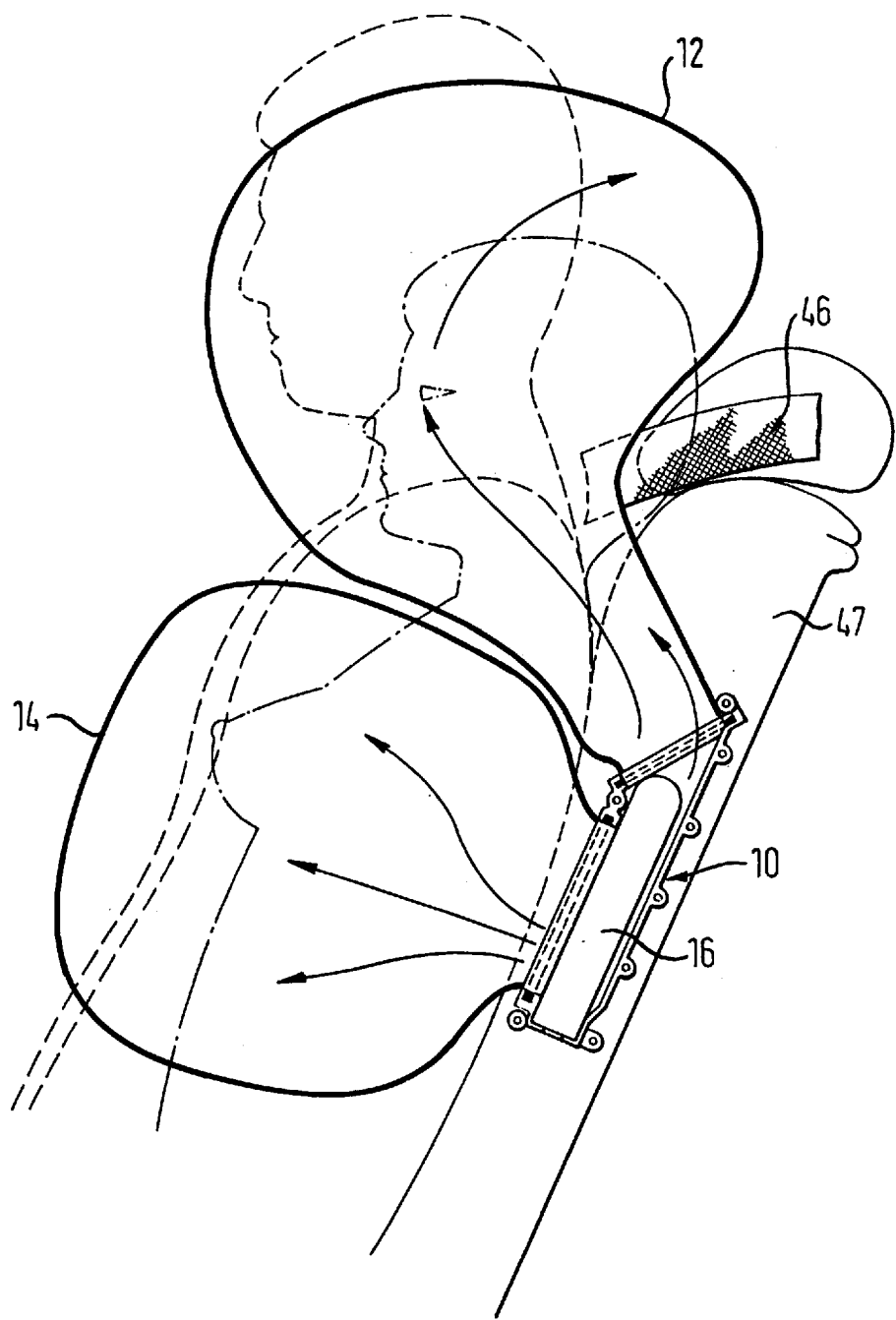
FIG. 9 shows the protective device of FIG. 6 with the two gas bags in the completely deployed state.

Finally FIG. 9 shows the two gas bags 12 and 14 in the completely deployed state. The reader will see that owing to the arrangement of the thorax gas bag 14 and of the head protecting gas bag 12 with the safety belt fastened there is optimum protection for a vehicle occupant following a lateral impact.

Owing to this configuration of the gas bag lateral impact protective device a series of advantages is produced. Firstly owing to the use of two gas bags, i. e. a head protecting gas bag 12 and a thorax protecting gas bag 14, the deployment direction of the head protecting gas bag 12 may be adapted in an optimum fashion to the run of the safety belt 46 so that same will not obstruct the deployment of the head protecting gas bag. The design of the head protecting gas bag 12 and the effect, related to it, on its direction of deployment remain without effect on the course of deployment of the thorax protecting gas bag 14. Owing to the use of a common compressed gas source for the deployment of both gas bags a particularly compact protective system is created, which may be integrated like a module readily in different types of seat back 47. This module can be readily adapted to different assembly situations, since while adhering to the same design of housing 10 only attachment lugs 42 customized to suit the respective seat back must be employed, which are cheap to manufacture. Since both gas bags 12 and 14 are connected via the interior of the housing 10 in one flow connection, when a lateral impact occurs equalization of the displaced volume from one gas bag to the other may take place. There is the advantage that the two housing shells 18 and 20 are suitable for manufacture by casting and assembly of the protective device only calls for simple screwing of the two housing shells together, between which all further parts of the protective device are secured in place. Finally by having a suitable design of the interior space of the housing 10 it is possible to arrange for an effect on the distribution of the gas emerging from the compressed gas source 16 and flowing to the two gas bags 12 and 14.

Figure 10:
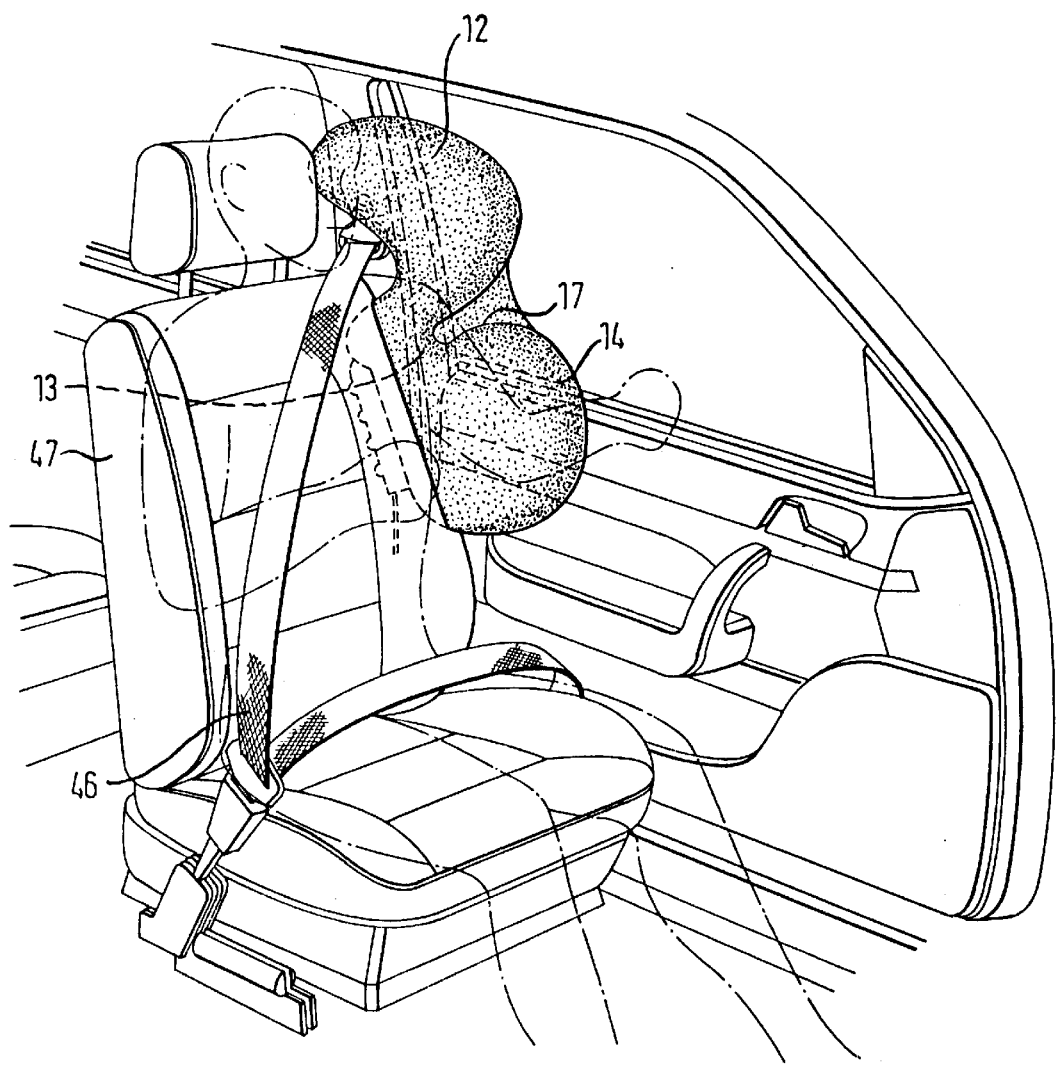
FIG. 10 is a view corresponding to FIG. 4 of a modified embodiment of the invention.

In the case of the modification of the first embodiment, depicted in FIG. 10, the head protecting gas bag 12 and the thorax protecting gas bag 14 are connected with one another by means of a compensation or equalization duct 13. The two gas bags 12 and 14 are produced integrally from common lengths of textile material. A seam line 17 connecting the superposed lengths of textile material delimits the gas bags 12 and 14 from each other and simultaneously defines the equalization duct 13.

Figure 11A:
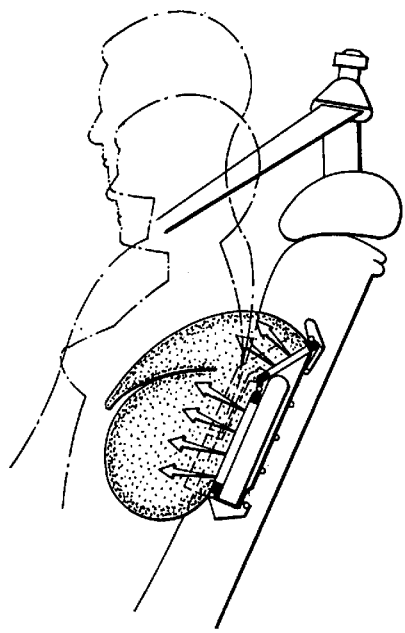
FIG. 11 shows views similar to those of FIGS. 6 through 9 relating to the modified design.
Figure 11B:
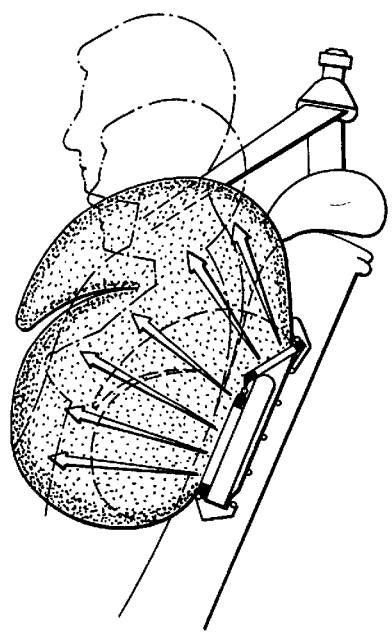
Figure 11D:
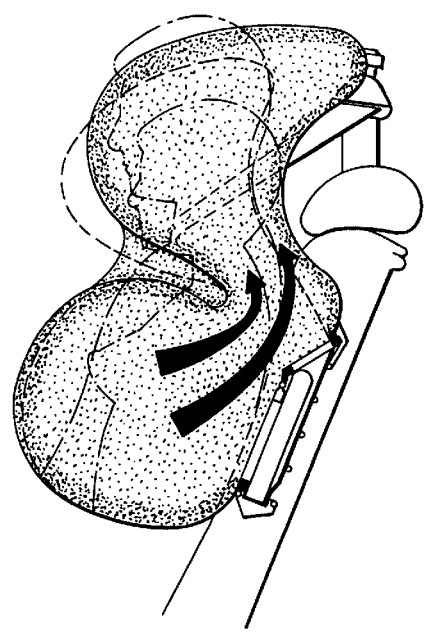
Figure 11C:
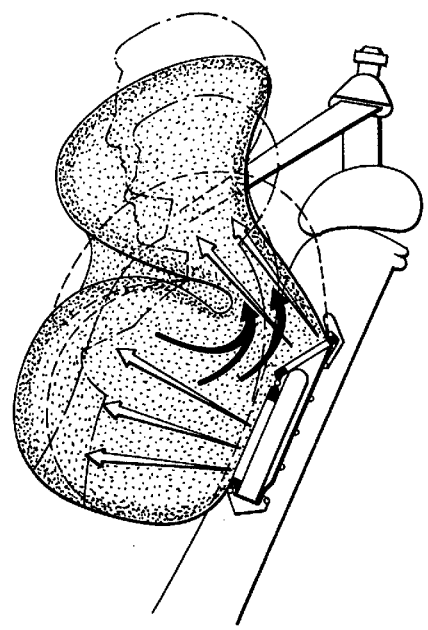

FIGS. 11a through 11d illustrate different stages in the deployment of the two gas bags. In these figures the directions of flow and of deployment are indicated by arrows. The state depicted in FIG. 11a is reached approximately 5 ms after the triggering of the gas generator. FIG. 11b shows the condition till approximately 10 ms have elapsed after triggering of the gas generator, FIG. 11c after approximately 15 ms and FIG. 11d after approximately 20 ms.

FIGS. 12 to 15 show a gas bag lateral impact protective device according to a second embodiment of the invention. In order to avoid unnecessary repetitions, reference is made to the above comments with respect to the first embodiment. The same reference numerals will be used for elements known from this first embodiment.

The most significant difference between the first and the second embodiment resides in the fact that in the second embodiment, the head protecting gas bag 12 and the thorax protecting gas bag 14 are formed integral with each other, with a separation wall 50 being arranged between the two gas bags 12, 14. This partition wall is provided with two openings 52 in order to provide a fluid communication from the compressed gas source 16 via the thorax protecting gas bag 14 to the head protecting gas bag 12.

The thorax protecting gas bag 14 is provided with a textile part 54 in order to direct the flow of pressurized gas released by the pressurized gas source 16 upwardly toward the head protecting gas bag 12. The textile part 54 furthermore serves as a protection for the wall of the thorax protecting gas bag 14 since it prevents the hot gases released by the pressurized gas source 16 from directly contacting the wall of the thorax protecting gas bag 14.

The thorax protecting gas bag 14 is furthermore provided with a gathering seam 56 by which the configuration of the thorax protecting gas bag 14 can be adapted to the shape of the vehicle door extending adjacent the thorax protecting gas bag 14 when same is inflated. For stabilizing the thorax protecting gas bag 14 in its inflated state, an attachment point 58 is provided above the inflation opening of this gas bag, the attachment point serving as an additional connection of the thorax protecting gas bag 14 to the vehicle seat back 47.

Figure 12:
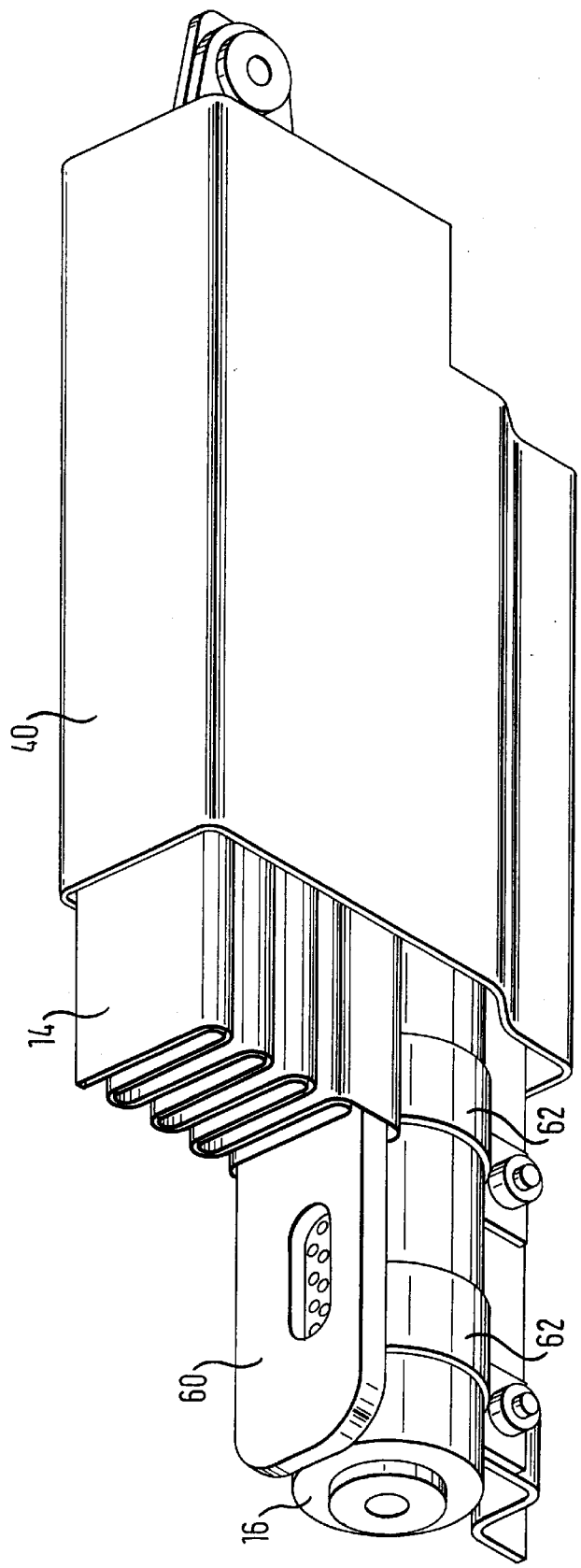
FIG. 12 shows a diagrammatic and partially sectioned view of a side impact gas bag protective device in accordance with a second embodiment of the invention.
Figure 13:
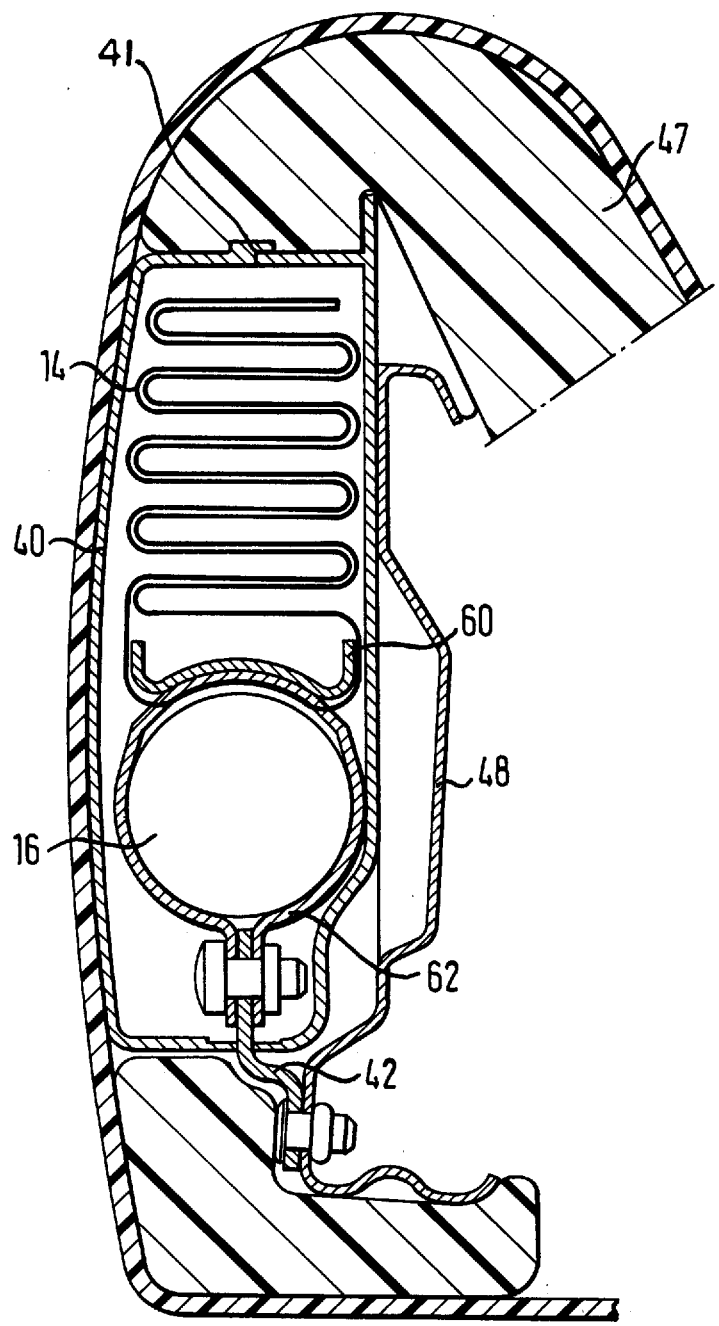
FIG. 13 shows a cross section taken through the protective device of FIG. 12.
Figure 14:
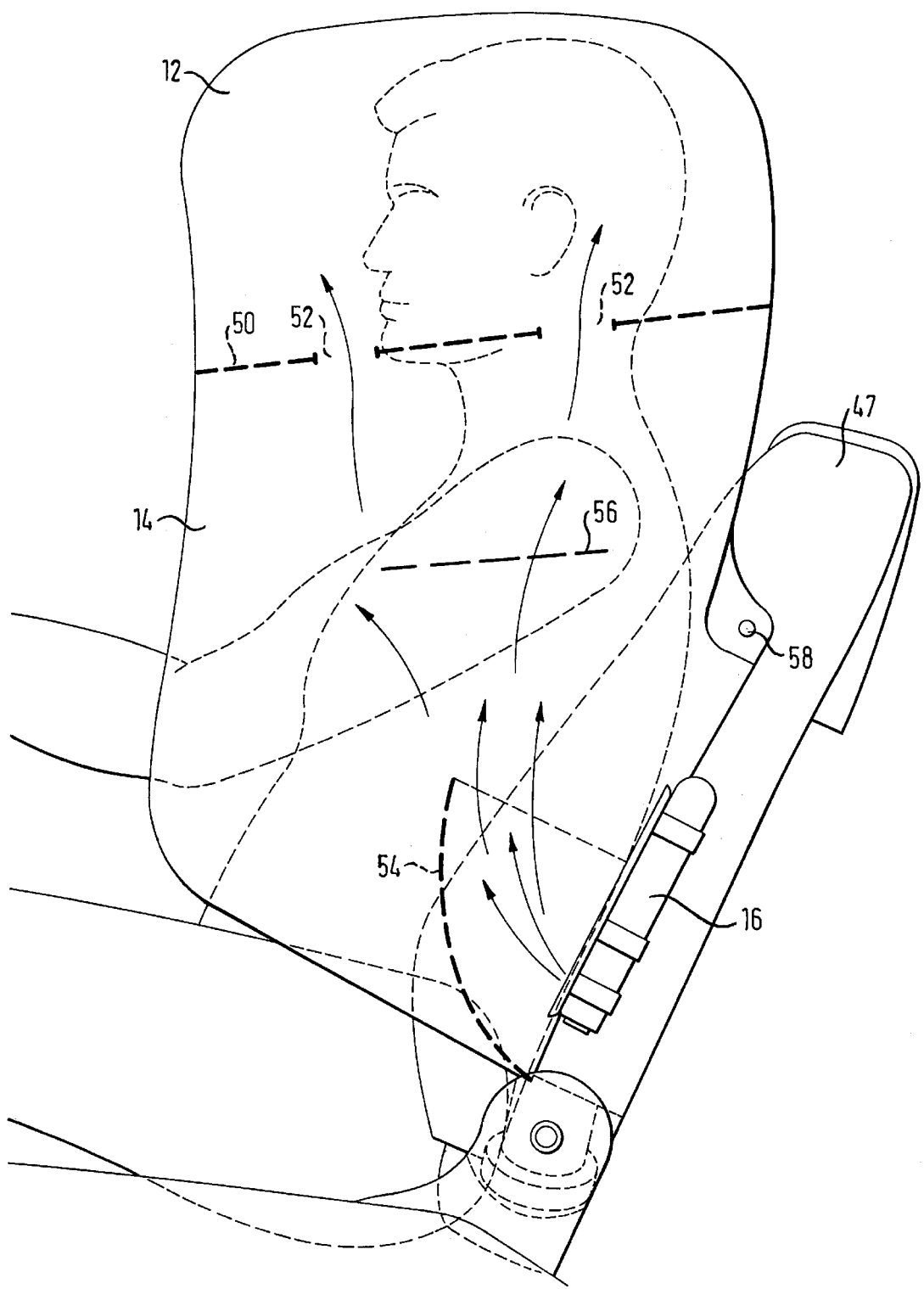
FIG. 14 is a schematic view of the arrangement of the thorax protecting gas bag and of the head protecting gas bag of FIG. 12.

As can be seen in FIGS. 12 and 13, the housing 10 of the gas bag lateral impact protective device comprises a mounting strip 60 for attaching the thorax protecting gas bag 14, and two holding sections 62 connected to the mounting strip 60 and engaging the compressed gas source 16. These holding sections 62 merge into attachment lugs 42 for connecting the housing 10 to the frame 48 of the seat back 47.

Figure 15:
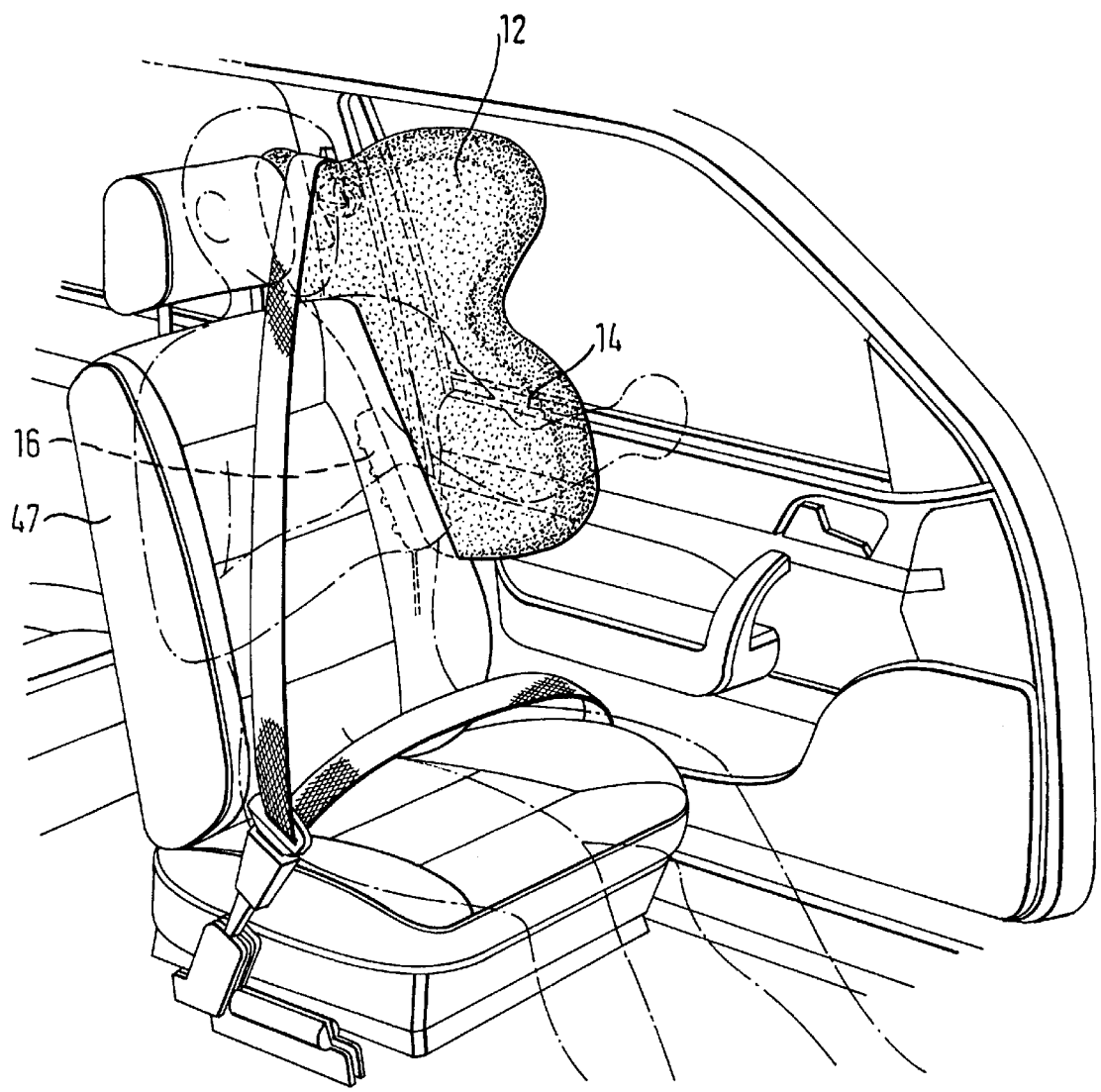
FIG. 15 is a diagrammatic and perspective view of the arrangement of the thorax protecting gas bag and of the head protecting gas bag of FIG. 12, both in the deployed state.

FIG. 16 shows an advantageous mode of folding the head protecting gas bag 12 and the thorax protecting gas bag 14 in order to achieve a deployment of the head protecting gas bag 12 mainly upwardly. Starting from a condition with the head protecting gas bag 12 and the thorax protecting gas bag 14 in a flat condition (view A of FIG. 16), the head protecting gas bag 12 is folded into the interior of the thorax protecting gas bag 14 (views B and C of FIG. 16). Subsequently the thorax protecting gas bag 14 with the head protecting gas bag 12 inside is folded in a zig zag manner (as shown in view D of FIG. 16), in order to obtain the completely folded condition of the two gas bags 12, 14. When the gas bags 12, 14 in this folded condition are subjected to pressurized gas released from the pressurized gas source 16, first of all the thorax protecting gas bag 14 is deployed in a space to the side of the seat back 47, and subsequently the head protecting gas bag 12 is inflated upwardly in order to provide a protective effect for the head of the vehicle occupant. Should the head protecting gas bag 12 encounter the seat belt extending from the vehicle occupant thorax towards the B column of the vehicle, the safety belt will be lifted upwards (as shown in FIG. 15) without obstructing deployment of the head protecting gas bag since a certain belt slack occurs during a side impact.

We claim:

1. A gas bag lateral impact protective device for vehicle occupants, which is integrated in the back of a vehicle seat and comprises a compressed gas source and further a thorax protecting gas bag and a head protecting gas bag which both are to be inflated by said compressed gas source and which are adapted to deploy on inflation in a space to a side of the seat back, said head protecting gas bag, upon inflation, deploying above said thorax protecting gas bag, said gas bags being independent from each other, separate connection openings for said thorax protecting gas bag and said head protecting gas bag are provided in a housing, said connection opening for said head protecting gas bag extends in a plane running obliquely to a longitudinal axis of the seat back.

2. A gas bag lateral impact protective device for vehicle occupants, which is integrated in the back of a vehicle seat and comprises a compressed gas source and further a thorax protecting gas bag and a head protecting gas bag which both are to be inflated by said compressed gas source and which are adapted to deploy on inflation in a space to a side of the seat back, said head protecting gas bag, upon inflation, deploying above said thorax protecting gas bag, said head protecting gas bag being adapted, in the course of inflation, initially to mainly deploy obliquely upward and forward and then to deploy mainly obliquely upward and rearward so that finally it assumes a position to the side of a head of a vehicle occupant.

3. The gas bag lateral impact protective device according to claim 2, wherein said gas bags are connected with each other by an equalization duct.

4. The gas bag lateral impact protective device according to claim 3, wherein said equalization duct is formed by a seam line by which said gas bags are furthermore separated from one another.

5. The gas bag lateral impact protective device according to claim 2, wherein said gas bags are formed integral with each other.

6. A gas bag lateral impact protective device for vehicle occupants, which is integrated in the back of a vehicle seat and comprises a compressed gas source and further a thorax protecting gas bag and a head protecting gas bag which both are to be inflated by said compressed gas source and which are adapted to deploy on inflation in a space to a side of the seat back, said head protecting gas bag, upon inflation, deploying above said thorax protecting gas bag, said gas bags and said compressed gas source being mounted at a housing as a single module, said housing being comprised of two housing shells which are joined together.

7. The gas bag lateral impact protective device according to claim 1, wherein separate attachment lugs are provided for attachment of said housing to a frame of said seat back.

8. A gas bag lateral impact protective device for vehicle occupants, which is integrated in the back of a vehicle seat and comprises a compressed gas source and further a thorax protecting gas bag and a head protecting gas bag which both are to be inflated by said compressed gas source and which are adapted to deploy on inflation in a space to a side of the seat back, said head protecting gas bag, upon inflation, deploying above said thorax protecting gas bag, said head protecting gas bag and said thorax protecting gas bag being so folded up that a part of said head protecting gas bag, while partially overlapping said thorax protecting gas bag, assumes an outside position on a side of said thorax protecting gas bag facing away from said compressed gas source.

9. A gas bag lateral impact protective device for vehicle occupants, which is integrated in the back of a vehicle seat and comprises a compressed gas source and further a thorax protecting gas bag and a head protecting gas bag which both are to be inflated by said compressed gas source and which are adapted to deploy on inflation in a space to a side of the seat back, said head protecting gas bag, upon inflation, deploying above said thorax protecting gas bag, said gas bags being held in folded form by a guard cover which jointly covers said gas bags, said guard cover being provided with a rip open seam aligned to extend along a longitudinal axis of said seat back.

* * * * *

UNITED STATES PATENT AND TRADEMARK OFFICE
CERTIFICATE OF CORRECTION

PATENT NO : 5,803,485
DATED : September 8, 1998
INVENTOR(S) : Dominique Acker et al.

It is certified that error appears in the above-identified patent and that said Letters Patent is hereby corrected as shown below:

Col. 7, line 28
 replace "1"
 with --6--.

Signed and Sealed this

First Day of June, 1999

Attest:

Q. TODD DICKINSON

Attesting Officer

Acting Commissioner of Patents and Trademarks